United States Patent
Ogilvie et al.

(10) Patent No.: US 7,525,373 B1
(45) Date of Patent: Apr. 28, 2009

(54) COMPENSATION OF PROCESS AND VOLTAGE VARIABILITY IN MULTI-THRESHOLD DYNAMIC VOLTAGE SCALING CIRCUITS

(75) Inventors: Clarence Rosser Ogilvie, Huntington, VT (US); David Solomon Wolpert, Rochester, NY (US); David James Hathaway, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/123,314

(22) Filed: May 19, 2008

(51) Int. Cl.
*H01L 25/00* (2006.01)
(52) U.S. Cl. .............................. 327/564; 327/565; 716/6
(58) Field of Classification Search ........................ None
See application file for complete search history.

(56) References Cited

U.S. PATENT DOCUMENTS

| | | | | |
|---|---|---|---|---|
| 6,674,672 B2* | 1/2004 | Forbes et al. | ............ | 365/189.09 |
| 6,880,142 B2* | 4/2005 | Cui et al. | ........................ | 716/6 |
| 6,927,619 B1* | 8/2005 | Doyle | ........................ | 327/534 |

OTHER PUBLICATIONS

Shuma, Stephen, Goodnow, Kenneth, and Twombly, Peter, "Integrated Circuit Optimization Using Islands To Correct On-Chip Variation", www.ip.com IPCOM000156732D, Aug. 1, 2007.

* cited by examiner

*Primary Examiner*—Long Nguyen
(74) *Attorney, Agent, or Firm*—The Law Firm of Andrea Hence Evans, LLC

(57) ABSTRACT

This invention relates to adaptively compensating for variations in integrated chip circuitry due to delays caused by multiple thresholds. The multi-threshold adaptive dynamic scaling system disclosed compensates for normal on-chip variations which affect system process and voltage variability, as well as overall performance. This system regulates a voltage control and provides high voltage thresholds, regular voltage thresholds, and low voltage thresholds to compensate for threshold voltage variations.

1 Claim, 5 Drawing Sheets

COMPENSATION OF PROCESS AND VOLTAGE VARIABILITY IN MULTI-THRESHOLD DYNAMIC VOLTAGE SCALING CIRCUITS

CROSS REFERENCE TO RELATED APPLICATIONS

There are no cross-references related to this application.

FIELD OF THE INVENTION

The present invention relates to on-chip power management technologies. The present invention more particularly relates to multi-threshold adaptive dynamic scaling systems used to compensate for nonnal on-chip variations which affect system perfomiance. Relevant potential applications for the present invention include CMOS circuits, integrated chip manufacture, microprocessors, portable computers, portable handheld devices, portable media player, digital cameras, low power electronics, and other battery powered electronics.

BACKGROUND OF THE INVENTION

The use of multiple-threshold and multiple gate length devices on a chip has become popular in IC design for handling the trade-off between speed and leakage power. These techniques are now being combined with other low-power techniques such as voltage scaling for further reducing system power.

Voltage scaling has a non-linear effect on delay (and power) for gates consisting of different threshold devices. These differences can cause difficulties in closing timing requirements for systems employing voltage scaling, where the worst-case critical path may depend on the specific supply voltage used.

This delay variability is compounded by process variability which is becoming more significant as device dimensions shrink, and also affects the various threshold and gate length devices differently, decreasing the correlation between the variation of characteristics (such as delay) of those circuits.

SUMMARY OF THE INVENTION

The present invention provides an apparatus and method of voltage scaling and process variability in designs containing different types of devices (e.g., multi-threshold and multi-gate length types of devices).

The present invention teaches a method of minimizing variation in delay between cells in an integrated circuit comprising grouping the cells into at least two groups, wherein cells are placed in different groups if they are at least one of different $V_T$ type or in different regions of the integrated circuit, connecting cells of a first of the at least two groups of cells to a first set of at least one supply voltage, connecting cells of a second of the at least two groups of cells to a second set of at least one supply voltage; and determining a relative delay variation between the at least two groups of cells and controlling the first set of at least one supply voltage and the second set of at least one supply voltage based on the determined relative delay variation to reduce the relative delay variation between delays of the at least two groups of cells.

An aspect of an embodiment of the present invention provides for an apparatus and method in which the supply voltages and/or well or body bias voltages of high-threshold, regular-threshold, and low-threshold device groups (hereinafter, "HVT", "RVT", and "LVT", respectively) may individually be adjusted to ensure correct functionality at each global supply voltage and process variation condition.

An aspect of another embodiment of the present invention provides for the apparatus and method in which these supply and body bias voltage controls can be combined such that the signals do not overlap. For example, adaptive body bias can be used to reduce the effects of process variation in a region-based technique while supply voltages can individually tune the different device types, as described in more detail in the following section.

Additional aspects, objectives, features and aims of the present invention will become apparent from the following description of the preferred embodiments with reference to the attached drawings.

DETAILED DESCRIPTION OF THE INVENTION

In the present invention, threshold voltage $V_T$ is conventionally defined as representing the gate to source voltage ($V_{GS}$) of a transistor at which the transistor "turns on" (i.e., at a point which significant drain to source current can begin flow. It is a common occurrence that lower levels of leakage current can flow at voltages where the gate to source voltage is less than or equal to the threshold voltage (i.e. at $V_{GS} \leq V_T$).

Silicon On Insulator (hereinafter, "SOI") is a method of constructing an integrated circuit in which the "body" of the transistor, (i.e. the region in which the conduction channel forms) is built on top of an insulating layer. This is generally in contrast to "bulk", where the transistor bodies are built in "wells" that are isolated from the substrate, or bulk, of the IC by a reverse-biased N-P junction. The relevance to the current invention is that one must apply a voltage to the well region (in "bulk") to maintain this reverse bias that isolates the well from the substrate (or outer well). Further, this well voltage, or bias, can adjust the threshold voltage of transistors built in the well.

In SOI systems, the "body" region is often left floating (i.e. uncontacted). However, it may also be contacted and have a bias voltage applied. Such a bias affects the threshold voltage, $V_T$, of the body in the same manner that a well bias affects the threshold voltage, $V_T$, of a bulk device.

Through the use of local voltage distribution networks, each of the different threshold device groups will be provided with its own supply voltage and/or well bias or (in SOI systems) body bias voltage, which may be adaptively tuned off of a scalable global supply.

Figure 1:
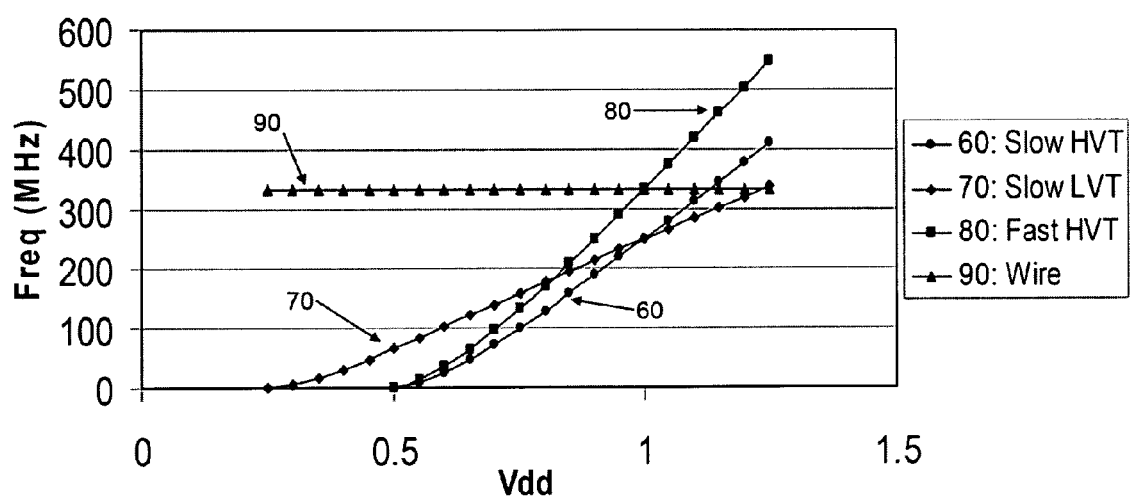
FIG. 1 illustrates a graph of the variation in performance of paths with different mixes of wire and multiple threshold devices as the supply $V_{dd}$ varies, in accordance with the embodiments of the present invention.

FIG. 1 illustrates how frequencies of individual paths in a multi-$V_T$ system scale with different supply voltages. It is seen that tinder fast process conditions (i.e., conditions that cause gate delays to be smaller than normal) the performance of a path of HVT gates has a high dependence on supply voltage (Vdd), indicated by the steep slope of its curve. In contrast, under slow process conditions (i.e., conditions that cause gate delays to be larger than normal) the performance of an HVT path has lower dependence on supply voltage, indicated by the lesser slope of its curve. The performance of a path of LVT gates operating at slow process conditions will have a still lower dependence on supply voltage. And the performance of a pure metal, or wire path (e.g., the RC delay of a long wire, considered separately from the delay of its driving gate) will have no dependence on supply voltage. Thus the depedence of performance on supply voltage differ with both the different compositions of each path (i.e. the fraction of each path delay due to HVT gates, RVT gates, LVT gates, and wire) and the process conditions, making accurate timing predictions very difficult for systems using voltage scaling techniques. Because of these timing inaccuracies, excessively large frequency guard bands must be used to guarantee correct functionality.

Figure 2:
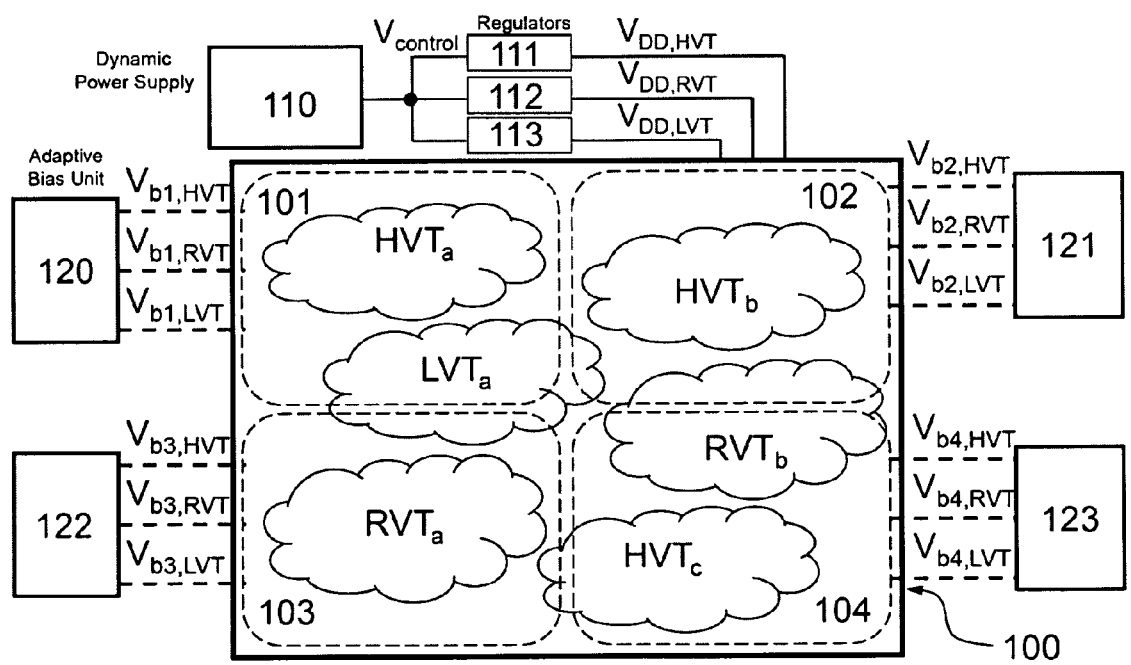
FIG. 2 illustrates a diagram of a system that uses separate adaptive bias units per chip, in accordance with the embodiments of the present invention.

In accordance with an aspect of an embodiment of the present invention, the threshold voltage is adaptively corrected. FIG. 2 illustrates an integrated circuit comprising gates of different threshold voltages where HVT, RVT, and LVT represent high, regular (or intermediate), and low voltage threshold gates, respectively. Dynamic power supply 110 allows the supply voltage input to voltage regulators 111, 112, and 113 that are conected to HVT, RVT, and LVT gates, respectively. Either statically (e.g., during manufacturing test) or dynamically (e.g., every time the circuit is powered on, or periodically or continuously during normal circuit operation) the performance of paths of different $V_T$ types is determined. This performance or delay determination may be accomplished by measuring the frequency of a ring oscillator comprising gates of a given $V_T$ (ring oscillators being well-known to those of skill in the art), by latching a result from a path comprising gates of a given $V_T$ and determining whether the result is properly captured, or by other means. The supply voltage for each $V_T$ type is then independently adjusted so that each $V_T$ type path meets its desired delay. By adaptively correcting the supply voltage to each $V_T$-type individually using these voltage regulators, one $V_T$-type can be assigned a 'baseline supply voltage', and then the other $V_T$-types can have their voltages dynamically adjusted to match the performance of the first type. In this case the target delay for the non-baseline $V_T$ types would be set to have a predetermined relationship to the delay of the baseline $V_T$ type. To limit system overhead, the most prevalent $V_T$-type could be chosen as the baseline. Alternatively, the $V_T$-type to be assigned the highest voltage can be chosen as the baseline, allowing one of the three regulators 111, 112, and 113 to be omitted (i.e., the supply for the corresponding device type would be taken directly from the output of dynamic power supply 110). The higher voltage supply would be chosen as the baseline, because typical voltage regulator designs require that the output voltage be lower than the input voltage.

Figure 5:
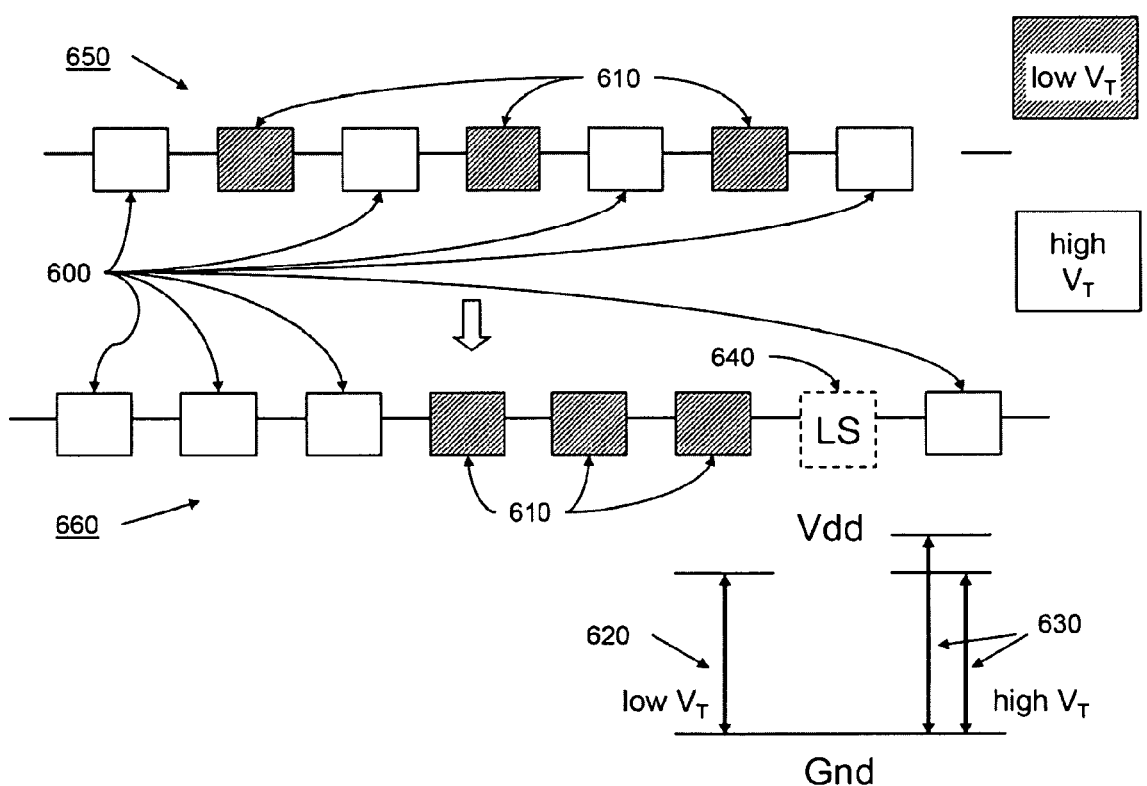
FIG. 5 illustrates a diagram showing a multiple threshold voltage system incorporating a level shifter, in accordance with the embodiments of the present invention.

In accordance with another aspect of an embodiment of the present invention, one may optionally insert level shifters between circuits fed by a lower voltage supply and others fed by a higher voltage supply, as showin in FIG. 5. It will be understood by those of skill in the art that the output voltage swing of a normal gate (e.g., a complementary CMOS inverter or NAND) is from its ground, or Vss supply voltage to its high, or Vdd supply connection. If a signal with a first voltage swing feeds a normal gate with a lower ground (higher Vdd) voltage, the gate to source voltage $V_{gs}$ of input NFET (PFET) transistor of the gate being fed will not be driven all the way to zero (the transistor will be underdriven), causing increased leakage. Because transistor leakage increases exponentially with $V_{gs}$ in the subthreshold region (when $V_{gs}$<$V_T$), the leakage is very sensitive to the degree of underdrive. In contrast, if a signal with a first voltage swing feeds a normal gate with a higher ground (lower Vdd) voltage, the gate to source voltage $V_{gs}$ of input NFET (PFET) transistor of the gate being fed will be driven negative (the transistor will be overdriven), causing decreased leakage. Level shifters are special circuits that are connected to two power supplies and take an input signal with a first voltage swing and output the same logical signal with a second voltage swing, to avoid increased leakage when a gate input is underdriven. Because insertion of level shifters will increase delay, area, and power, it is advantageous to reduce the number of level shifters that are inserted.

Thus, it may be advantageous to adjust the supply voltages so that, across all or most of the dynamic voltage scaling and expected process variation range, the supply voltage for a first $V_T$ type bounds that for a second $V_T$ type, meaning that the ground of the first is less than or equal to that of the second, and the Vdd of the first is greater than or equal to that of the second. In this case signals from first $V_T$ type gates to second $V_T$ type gates will be overdriven and signals from second $V_T$ type gates to first $V_T$ type gates will be underdriven, and level shifters are only needed for signals going from second $V_T$ type gates to first $V_T$ type gates and may be ommitted on signals going from first $V_T$ type gates to second $V_T$ type gates, and the leakage reduction benefits of level shifters may still be achieved. For a further beneficial effect, the lower $V_T$ or shorter channel length devices, which have higher inherent leakage, will have a lower (bounded) supply voltage. A further reduction in the number of level shifters may be achieved by assigning $V_T$ levels in a manner that reduces the number of transitions between gates of different $V_T$ types, thus reducing the number of level shifters required. This is illustrated in path 650 of FIG. 5 where high $V_T$ gates 600 are mixed with low $V_T$ gates 610, producing higher leakage, and in path 660 the low $V_T$ gates 610 have been grouped together. Also in the path 660 there is only one point at which a low $V_T$ gate 600 feeds a high $V_T$ gate 610, and where a level shifter 640 would be required to avoid additional leakage.

In accordance with another aspect of an embodiment of the present invention, if the voltage adjustments are relatively small, one might chose to omit these level shifters at the cost of some amount of increased leakage. If devices connected to different supplies are then connected in a path, some gates in the path would effectively be overdriven and some would be underdriven. To reduce this additional leakage, one could take either or both of two steps:

1. Try to reduce the number of transitions in paths between higher voltage (bounding) and lower voltage (bounded) circuits. This is illustrated in path 660 of FIG. 5, in which, if the supply voltage of low $V_T$ gates 610 bounds the supply voltage of high $V_T$ gates 600 and level shifter 640 is omitted, there is only one signal from a low $V_T$ gate 610 to a high $V_T$ gate 600.

2. Set the supply voltages so that, across all dynamic voltage ranges and all expected process variation, the supply voltage of a higher leakage device type (LVT) is ≧that of a lower leakage device type. This is illustrated in FIG. 5, where the supply voltage for low $V_T$ gates 620 is set at Vdd to ground range 620, and the supply voltage for high $V_T$ gates 600 varies between different Vdd to ground ranges 630 according to the relative process variation of high $V_T$ and low $V_T$ gates, so that their relative performances (the ratio of delays between high and low $V_T$ gates) remains fixed, but all possible Vdd to ground ranges 630 bound the Vdd to ground range 620.

The latter step will ensure that the higher leakage devices are more thoroughly turned off. By defining maximum overdrive and maximum underdrive potentials, functionality can still be ensured, and electronic design automation can determine when the benefits of increasing or decreasing a device's $V_T$-type (for power or speed, respectively) would be outweighed by the leakage consequences of supply voltage differences across the potential range of drive voltages. In other words, a tradeoff may be made between the amount of variation allowed and the amount of underdrive (and hence additional leakage) allowed.

In accordance with an aspect of an embodiment of the present invention, FIG. 2 shows that supply voltage (VDD) plays a large role in the performance of the different HVT and LVT paths under different process conditions. A notable exception is for the metal lines 90 which are purely linear elements and, for the same source signal transition time, will have their sink nodes reach half of their final voltage value in the same amount of time, regardless of the value of the supply voltage. The ability to change supply voltage is a useful one for saving power in modern systems, generally referred to as dynamic voltage scaling. So, there are two points to be made with the non-metal paths.

Firstly, for each path the relative speeds (i.e. the ordering of the achievable frequency values for the different path types 60, 70, and 80 at different process conditions) are difficult to determine and vary as voltage changes. Secondly, the logic path exhibiting the minimum achievable frequency, also known as the critical path, can change as the supply voltage changes. Because a path which was not critical can become critical, it is very difficult to ensure that multi-threshold, dynamic voltage scaling systems are capable of meeting specific frequency requirements.

Further in regard to FIG. 2, it is shown that the slow HVT path 60 is the critical path below 1 Volt of supply voltage, while above 1 V, the slow LVT path 70 is the critical path. Notably, that the plot shown in FIG. 2 is very sensitive to the process variation, as seen in the differences in slow HVT curve 60 and fast HVT curve 80. Because there is lower correlation between process variations of gates of different $V_T$ types than among gates of the same $V_T$ type, a path of one type may be faster or slower than a path of another $V_T$ type. For example, at Vdd of around 0.8, the slow LVT curve 70 has a higher achievable frequency than the slow HVT curve 60, but a lower achievable frequency than the fast HVT curve 80.

In accordance with another aspect of an embodiment of the present invention, FIG. 2 illustrates that $V_T$ is not the only parameter varied in FIG. 1. Another equally important piece of multi-$V_T$ design is handling the different impacts of process variation on each device type. At least part of these process variations are location-dependent, so the chip shown in FIG. 2 may be split into regions 101, 102, 103, and 104 with each of their local $V_T$-types individually compensated for process variation. Although the process variations will not change (ignoring aging effects), the adaptive bias units 120, 121, 122, and 123 would have to take into account any changes in supply voltage. This further complication is necessary because the process variation impact differs for each supply voltage as well as each $V_T$-type.

In accordance with another aspect of an embodiment of the present invention, an alternate approach is to split up the supply voltage regulators to control the $V_T$-types in each region, as opposed to using them for global compensation.

Further, in accordance with an aspect of an embodiment of the present invention, FIG. 2 illustrates an adaptive system plot. In adaptive system design, there are two major controls that can be adjusted while a chip is running. The method of control is typically referred to as "runtime adaptation" which means making adjustments after the chip has been fabricated. More specifically, the runtime adaptation controls are the supply voltage (hereinafter "$V_{DD}$"), and the body voltage (hereinafter "$V_B$"). The runtime systems capable of adjusting $V_{DD}$ and $V_B$ are dynamic voltage scaling (hereinafter "DVS") and adaptive body bias (herein after "ABB"), respectively. Tuning $V_{DD}$ and $V_B$ allow the system speed and power to be adjusted. Although only one body voltage $V_B$ is shown for each $V_T$ type in each region, it will be understood that, in general, a separate $V_B$ value would be applied to PFETs and NFETs, and that further bias voltages (e.g., deep well biases) could be applied as well to adjust performance. Regarding speed adjustments, increasing $V_{DD}$, increasing NFET $V_B$, or decreasing PFET $V_B$ results in increased performance. Regarding power adjustments, decreasing $V_{DD}$, decreasing NFET $V_B$, or increasing PFET $V_B$ results in reduced power consumption.

Keeping in mind a primary goal of any chip design is to have it function properly at the desired speed. A secondary goal is to have it dissipate as little power as possible while meeting that frequency requirement. The proposed system addresses both of these points.

In light of the above discussion, given an integrated circuit 100, as shown in FIG. 2, which consists of a set of multi-threshold logic devices (e.g. $HVT_a$, $HVT_b$, $HVT_c$, $RVT_a$, $RVT_b$, $LVT_a$), the proposed system controls the maximum operating frequency of the integrated circuit with improvements in both reliability and power over prior art. This improvement comes through the combination of DVS and ABB. It will be understood that LVT, HVT, and RVT devices, shown being grouped into clusters, may be interspersed across the chip so the various local groups of devices of different $V_T$ types may overlap.

Referring again to FIG. 2, in accordance with an aspect of an embodiment of the present invention, the DVS system consists of a dynamic power supply 110, which provides a control voltage $V_{control}$ to three regulators 111, 112, 113. This control voltage is generated from a system frequency requirement, which may change during operation. The regulators 111, 112, 113 then convert this control voltage into the appropriate HVT, RVT, and LVT supply voltages ($V_{DD,HVT}$, $V_{DD,RVT}$, $V_{DD,LVT}$, respectively) such that, in the absence of across-ship variation, the devices of each $V_T$ type can meet the frequency requirement dictated by the system. The Vdd from each regulator supplies all of the devices of the corresponding $V_T$ type, so that regulator 111 produces the supply voltage $V_{DD,HVT}$ for devices in groups $HVT_a$, $HVT_b$, and $HVT_c$, regulator 112 produces the supply voltage $V_{DD,RVT}$ for devices in groups $RVT_a$ and $RVT_b$, and regulator 113 produces the supply voltage $V_{DD,LVT}$ for devices in group $LVT_a$. This high level control over the individual device types will help to guarantee functionality while minimizing power requirements. This can be considered a "coarse tuning" control to adjust the average performance of devices of each $V_T$ type across the chip. It will be understood that, while the present example refers to three $V_T$ types, the method can apply to any plurality of distinct $V_T$ types.

In accordance with an aspect of an embodiment of the present invention, the ABB system addresses a slightly different problem. When a chip is fabricated, each area on the chip may have slightly different feature sizes than its neighbors. This is termed process variation. To combat process variation, the threshold voltages in each of several defined regions of the chip (101, 102, 103, 104) can be retuned using the adaptive bias units 120, 121, 122, 123. It will be understood that, while four regions are shown, the inventive method would apply equally well to partitioning of the chip into other numbers of regions. Because this process variation has a different impact on each type of device, the adaptive bias unit for each region will generate different bias voltages for each device type. ($V_{bx,HVT}$, $V_{bx,RVT}$, $V_{bx,LVT}$, where x is an integer between 1 and the number of regions). The body bias voltages can be considered a "fine tuning" control on the performance of devices of each $V_T$ in different regions of the chip.

Figure 3:
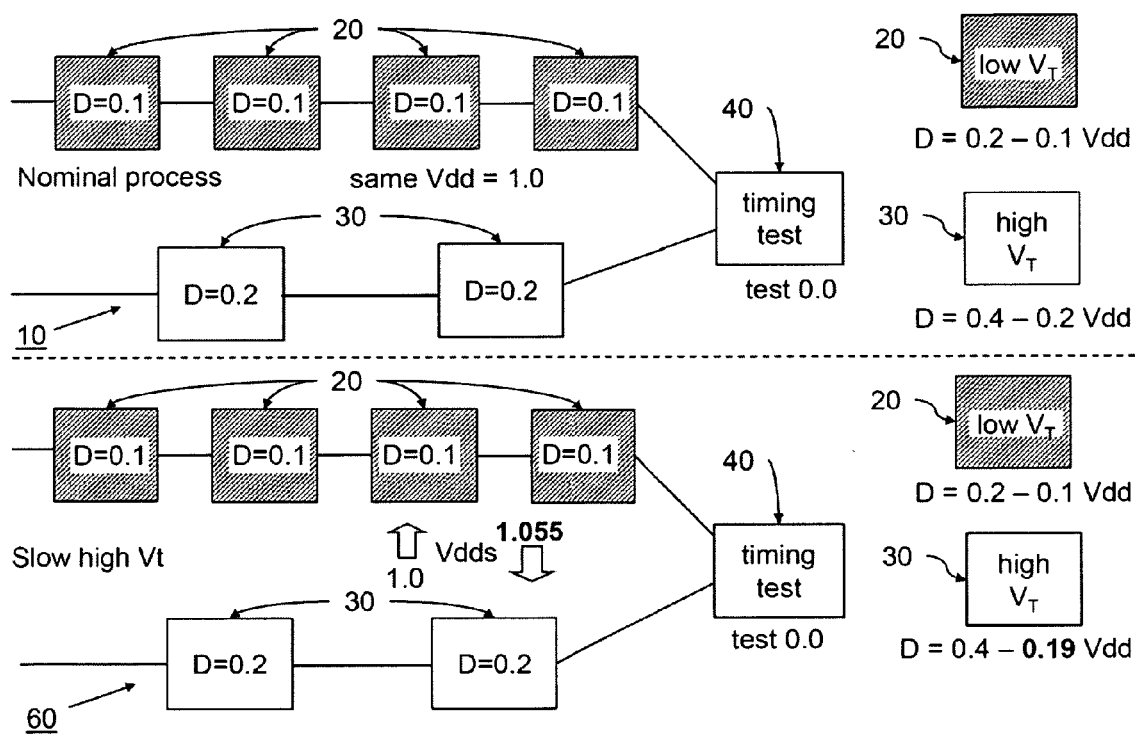
FIG. 3 illustrates a diagram of a pair of circuit paths feeding a timing test operating at different process conditions, in accordance with the embodiments of the present invention.

In accordance with another aspect of an embodiment of the present invention, FIG. 3 illustrates a multi-$V_T$ system and provides separate supplies or well biases to low $V_T$ gates 20 and high $V_T$ gates 30. As shown, two separate supplies are adaptively controlled in order to maintain consistent, relative delay between the $V_T$ families. Under condition 10, both types of gates have nominal processing and the same supply voltage Vdd of 1.0 volts may be applied to both types of gates, achieving a 0.0 test value (in this example a difference between the path delays leading to the test) as desired. Under condition 60, however, process variation causes high $V_T$ gates 30 to be slow, and a higher supply voltage of 1.055 volts is applied to these gates to compensate for the variation and again achieve the desired test value of 0.0. It is possible to control both supplies simultaneously to reduce the delay variation for all $V_T$ families. There are at least two supply/bias control options. One option is to static control. Static control is based on a chip parametric test. Another option is adaptive control. Adaptive control uses feedback gained from performance monitoring in order to control the voltage.

Figure 4:
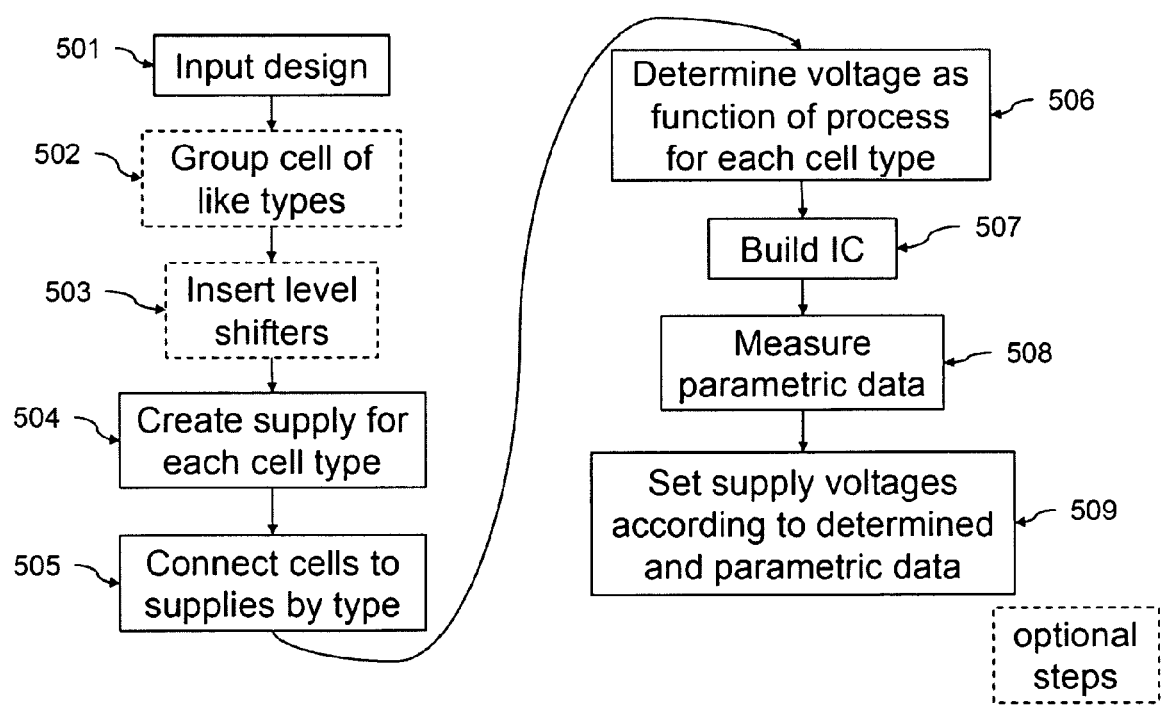
FIG. 4 illustrates a flow chart of a static control method, in accordance with the embodiments of the present invention.

In accordance with another aspect of an embodiment of the present invention, FIG. 4 illustrates illustrates a flow chart showing a static control method. Element 501 represents the input design stage. Element 502 represents an optional stage of grouping cells of the same $V_T$ type to reduce the number of signal transitions between gates of different $V_T$ types, and hence reduce the excess leakage due to underdrive or the number of level shifters required, as illustrated in FIG. 5 in the alteration of path 650 to path 660. Element 503 represents an optional stage in which level shifters are inserted. Element 504 represents a stage for creating a supply for cells of each $V_T$ type. Element 505 represents connecting cells to respective supplies based on the cell's $V_T$-type. Element 506 represents a stage in which voltage is determined as a functon of process for each cell's $V_T$-type. Element 507 represents a stage for building an appropriate IC. Element 508 represents a stage for measuring parametric data. Element 509 represents a stage where supply voltages are set according to the voltage function of process determined in step 506 and the parametric data measured in step 508.

In accordance with another aspect of an embodiment of the present invention, FIG. 5 illustrates a diagram that shows a resolution to signal swing difference concerns. If supplies are used for voltage compensation, signal swing changes can vary between source/sink gates. Such variations can cause increased leakage.

As a resolution for handling variation concerns, one option is to ignore the variation by assuming the $V_{dd}$ difference between source and sink gates of any signal is small enough such that there is limited leakage impact. This method can optimize logic in order to reduce the number of transitions between $V_T$s in a path and thus further reduce this limited leakage impact.

A second, more costly option, is to insert level shifters. This method can also optimize logic in order to reduce the number of transitions between $V_T$s in a path and hence reduce the number of level shifters that need to be inserted. The voltage can be set such that the voltage range for one supply is greater than that of other supplies across the entire process variation. This method further allows level-shifting in only one direction (e.g. in the direction of LVT to HVT).

Either of these options may be further optimized by setting the voltage range such that $V_{dd}$ for one $V_T$ type (i.e. LVT) is greater than Vdd for another $V_T$ type (i.e. HVT) across the entire process range. This method ensures overdrive on LVT fed by HVT reducing leakage on these LVT gates, and ensures only HVT gates which have an inherently lower leakage will be underdriven, causing less additional leakage due to underdrive. This method further reduces internal path LVT leakage because of the lower LVT voltage.

Optionally, relative supply values can be adjusted to compensate for different delay varitations other than $V_T$. As an example, groups of circuits known to have poorly correlated process or aging-dependent variations can be connected to separate supplies.

The apparatus and methods of this invention have been described with respect to multiple regions on individual integrated chips. However, it is contemplated that the apparatus and methods of multi-threshold dynamic voltage scaling of the present invention may be employed with a plurality of integrated chips.

The invention has been described in detail with particular reference to certain preferred embodiments thereof, but it will be understood that variations and modifications can be effected within the spirit and scope of the invention.

The invention claimed is:

1. A method of minimizing variation in delay between cells in an integrated circuit, comprising:
   grouping the cells into at least two groups, wherein cells are placed in different groups if they are at least one of:
   i. different $V_T$ type or,
   ii. in different regions of the integrated circuit;
   connecting cells of a first of the at least two groups of cells to a first set of at least one supply voltage;
   connecting cells of a second of the at least two groups of cells to a second set of at least one supply voltage; and
   determining a relative delay variation between the at least two groups of cells;
   controlling the first set of at least one supply voltage and the second set of at least one supply voltage based on the determined relative delay variation to reduce the relative delay variation between delays of the at least two groups of cells.

* * * * *